United States Patent
Fulbrook et al.

(10) Patent No.: US 11,944,079 B1
(45) Date of Patent: Apr. 2, 2024

(54) GAMEFISH ATTRACTOR SYSTEM

(71) Applicant: Efficiency Products, LLC, Fairfax, VA (US)

(72) Inventors: Jim E. Fulbrook, Fairfax, VA (US);
David J. Fulbrook, Fairfax, VA (US);
Jason D. Fulbrook, Fairfax, VA (US)

(73) Assignee: Efficiency Products, LLC, Fairfax, VA (US)

( * ) Notice: Subject to any disclaimer, the term of this patent is extended or adjusted under 35 U.S.C. 154(b) by 0 days.

(21) Appl. No.: 18/369,251

(22) Filed: Sep. 18, 2023

(51) Int. Cl.
*A01K 61/73* (2017.01)

(52) U.S. Cl.
CPC .................................... *A01K 61/73* (2017.01)

(58) Field of Classification Search
CPC ...................................................... A01K 61/73
See application file for complete search history.

(56) References Cited

U.S. PATENT DOCUMENTS

| | | | |
|---|---|---|---|
| 3,028,837 A * | 4/1962 | Tuttle | A01K 61/17 119/218 |
| 3,186,120 A | 6/1965 | Layson | |
| 4,490,071 A | 12/1984 | Morrisroe | |
| 4,534,675 A | 8/1985 | Morrisroe | |
| 4,550,518 A | 11/1985 | Layson | |
| 4,672,764 A * | 6/1987 | Dempsey | A01K 97/00 43/4 |
| 4,727,672 A | 3/1988 | Hill | |
| 5,315,779 A | 5/1994 | Fussell | |
| 5,906,067 A | 5/1999 | Layson | |
| 6,244,218 B1 | 6/2001 | McNeil | |
| 6,269,582 B1 | 8/2001 | Feld | |
| 6,343,567 B1 | 2/2002 | McNeil | |
| 6,978,735 B1 | 12/2005 | Yeager | |
| 7,134,235 B2 | 11/2006 | Gifford | |
| 7,512,325 B2 | 3/2009 | Eldredge | |
| 8,042,491 B2 * | 10/2011 | Fulbrook | A01K 61/70 119/223 |
| 10,667,471 B1 * | 6/2020 | Babb | A01G 13/0231 |
| 2002/0095850 A1 * | 7/2002 | Jones | A01K 91/02 43/4 |
| 2008/0245310 A1 * | 10/2008 | Kania | A01K 61/70 119/217 |
| 2008/0250712 A1 * | 10/2008 | DiPaolo | A63F 3/00157 47/79 |
| 2019/0112770 A1 * | 4/2019 | Lee | E02B 3/14 |
| 2022/0142058 A1 * | 5/2022 | Ding | A01G 9/16 |

* cited by examiner

*Primary Examiner* — Monica L Perry
*Assistant Examiner* — Brittany A Lowery
(74) *Attorney, Agent, or Firm* — Invention To Patent Services; Alex Hobson

(57) ABSTRACT

A gamefish attractor system is modular, having interconnects that are configured to attach a first cover assembly to a second cover assembly to produce two separate cover regions and also attach to a spawning bed. Each cover region has a pair of fins attached to a frame by the interconnects. The fins extend up from the floor of the body of water to provide cover or shelter for the gamefish. A cover assembly has a cover frame that includes frame extensions that extend from a first fin to a second fin. Two cover regions may share a fin to produce the adjacent cover regions. The frame extensions are coupled to the fins by interconnects that may be detachably attachable to the fin and to the frame extension. A cover frame may include a spawning tray wherein the interconnects couple the fins to the spawning tray to form a cover region.

18 Claims, 8 Drawing Sheets

GAMEFISH ATTRACTOR SYSTEM

BACKGROUND OF THE INVENTION

Field of the Invention

The invention relates to a gamefish attractor system that is modular enabling any number of cover regions to be formed in a row or other pattern to attract fish and also is configured to attach to a separate spawning bed.

Background

Gamefish prefer cover as this protects them from other larger fish and also hides them from smaller bait fish. Small baitfish may swim by a cover region and the gamefish may easily suck them in for a quick and easy meal. Also, gamefish make beds during spawning season to lay eggs and/or to protect fry. The gamefish will protect the spawning bed and chase off predators including other fish and turtles. Many spawning beds are just a clearing in the vegetation, wherein the vegetation around the cleared away area provides some protection for the eggs or fry. In many bodies of water however, the spawning beds do not provide much if any cover for the fry and the gamefish loses a large percentage to predators. With no barriers extending up around the fry or eggs, it is difficult for the gamefish to always protect the entire perimeter. Gamefish will not spawn when in close proximity to other bass.

SUMMARY OF THE INVENTION

The invention is directed to a gamefish attractor system that is modular, having interconnects that are configured to attach a first cover assembly to a second cover assembly to produce two separate cover regions, or attach to a separate spawning bed. A game fish attractor may have cover regions configured in a row, or in a grid pattern, or any other suitable pattern. Each cover region is defined by a pair of fins that extend up from a cover assembly or cover frame to provide a protected area for gamefish. The fins may be coupled to frame extensions or to other fins by interconnects. The gamefish attractor may be configured on a floor of a body of water and the fins may extend up to produce a cover region that provides cover or shelter for the gamefish. Gamefish may spend time in the cover region to more effectively snare baitfish as they swim by the fins. Also, the cover assembly may be coupled with a spawning bed, having a tray to receive a spawning material, such as a spawning mat or natural spawning material, such as gravel.

A cover assembly may include a cover frame that includes frame extensions, such as rods, that extend from a first fin to a second fin. A plurality of cover regions may be configured in an assembly of the gamefish attractor and these cover regions may be in a row, or configured in orthogonal orientations to each other. Two cover regions may share a fin to produce the adjacent cover regions, wherein the first cover region is formed between a first fin and second fin and the second cover region is formed between the second fin and a third fin. The frame extensions may have the same or different lengths. The frame extensions are coupled to the fins by interconnects that may be detachably attachable to the fin and to the frame extension. Also, a cover region may include one frame extension and three fins, thereby producing a three-sided cover region with only one opening into the cover region around the perimeter.

An interconnect has a first connect portion for connecting to the fin and a second connect portion for connecting to the frame extension or a second fin. A first end of the fin may be coupled to the first connect portion of an interconnect by inserting the fin attachment, such as a cylindrical shaped portion of the fin extending along the base end of the fin, into the first connection portion through a first slot. The first connect portion may be configured to expand the width of the first slot to enable the fin attachment to be pressed into the first connect aperture. The frame extension may then be inserted into the second connect aperture of the second connect portion. The interconnect may have the first interconnect portion configured orthogonal to the second interconnect portion, wherein the first connect aperture axis is substantially orthogonal to the second connect aperture axis, or within about 15 degrees of orthogonal. The interconnect in reversible, wherein either the first or second interconnect portion can be coupled to the fin attachment.

A fin may have a shape that is configured to provide cover but may be curved to prevent snagging of lines or ropes thereon. A fin may have a generally bell-shape along the extended end from the base. The fin may have an upper extension portion that is flat and then curved regions from this flat upper extension portion to the sloped regions that slope down to the base. A fin may provide shade and produces a barrier for predators and other animals from eggs and/or fry.

A fin may have a camouflage pattern imprinted thereon such as a foliage imprint, or a natural element imprint, such as a log. The foliage imprint may be of grass and may be a color to better attract gamefish to the cover region. The grass of the foliage imprint may be separated by an open area that is a different color of shade of color. The grass imprint may be a dark color, such as dark green and the space between the grass may be lighter in color, such as a lighter green color. This alternating color tone may provide effective camouflage and may be spaced at about 25 mm intervals between dark and light tones, wherein the grass is about 25 mm wide and the open space between the grass is about 25 mm wide. The imprint may be a decal or may be painted or otherwise applied onto the fin. Also, a fin may be made out of a material that is effective to enable algae to grow thereon, such as plexiglass or poly(methyl methacrylate) (PMMA) or other plastics materials that enable algae growth thereon. Also, the algae growth on the fins may attract smaller feeder fish as they may feed on the algae growing on the fins.

A fin may have a length from a first end to a second end of about 50 cm or more, 60 cm or more, about 75 cm or more, about 1 m or more and any range between and including the length values provided. A fin may have a height from a base end to an extended end of about 20 cm or more, about 30 cm or more, about 35 cm or more, about 40 cm or more, about 50 cm or more and any range between and including the height values provided. The fins may have a thickness of about 3 mm or more, about 5 mm or more, about 8 mm or more and any range between and including the thickness values provided. A fin may have a smooth curved extended end extending from the base end. This smooth profile may prevent snagging of hooks on the fin. Also, the thin nature of the fin may enable the fin to automatically float vertically from the base end to the extended end, wherein the extended end is vertically above the base end when submerged in water.

A cover assembly may be sized to accommodate a particular species of fish and may have a width from a first fin to a second fin, or a frame extension length or fin length of about 25 cm or more, about 30 cm or more, about 40 cm or more, about 50 cm or more, about 60 cm or more, about 75 cm or more, about 1 m or more and any range between and including the length values provided. The width between the fins may be suitable for a large gamefish, such as a largemouth bass. The length of the cover region or frame extension may be about the same as the length of the fins to enable interchanging a fin for a frame extension when having a three-sided cover region. The dimensions of the cover region formed by the fins and frame extensions is selected to be conducive to attracting game fish for laying their eggs and/or fry. The cover region formed by the cover assembly may be rectangular in shape, with the fins extending substantially parallel to each other, or within about 15 degrees of parallel and with the first frame extension extending substantially parallel with the second frame extension, or third fin, or within 15 degrees of parallel. The length of the fin may be greater than the width from a first fin to a second fin across a cover region and the ratio of the fin length to the width may be about 1.25:1, about 1.5:1, about 1.75:1 or even 2.0:1, or any range between and including the ratios provided. The higher this ratio, the more elongated the depth of the cover region from an opening to the cover region.

A gamefish attractor system may be configured with a spawning bed, wherein the cover assembly is coupled to a spawning bed. A bed interconnect may couple a fin or frame extension to a spawning bed. Each of the bed interconnects may have a first connect portion for connecting to the fin or frame extension, and a second connect portion for connecting to the spawning bed. An exemplary spawning bed has a bed frame with bed walls that extend up from the bed base forming a spawning tray. A plurality of flow aperture may be configured in the bed base to allow a flow of water and oxygen to the eggs or fry. A bed retainer may extend from the bed frame to retain a spawning mat within the bed recess formed by the bed walls of the spawning tray. The spawning material, such as a spawning mat may be placed into the bed frame and retained by the retainer flange extending over the top of the spawning mat. A retainer post may extend through the spawning mat and be secured to the bed frame or bed base.

An exemplary bed interconnect has a first connect portion for connecting to a fin or frame extension and a second connect portion for connecting to the spawning bed, and a foot coupled to a foot extension. The second connect portion has a second connect slot for receiving a wall of the bed frame. The first connect portion has a first connect aperture and a first connect slot. The interconnect has the first interconnect portion configured orthogonal to the second interconnect portion, wherein the first connect aperture axis is orthogonal to the second connect aperture axis, or within about 15 degrees of orthogonal. The foot extension may be configured to provide an offset distance between the base of the spawning bed and a floor of the body of water to provide a flow of water and oxygen to the fry or eggs. The offset distance may be about 10 mm or more, about 20 mm or more, about 25 mm or more, about 30 mm or more and any range between and including the values provided.

A foot or leg extension of a foot may be configured to keep the spawning bed and spawning material therein substantially horizontal, even on a sloped floor surface. A gamefish attractor may be placed on a floor of a body of water at a preferred depth of about 60 cm or more, about 75 cm or more, about 1 m or more, about 1.25 m or more, about 1.5 m or more, about 2 m or more and any range between and including the values provided. The floor of the body of water may be sloped and therefore, the legs may be further extended on one side or end of the gamefish attractor than the other end or side to provide a substantially horizonal spawning bed, or within about 15 degrees of horizontal.

A spawning material may be placed into the spawning bed or spawning tray and may be a natural material such as pea gravel or other suitable stone, or may be a manufactured spawning material, such as a spawning mat. An exemplary spawning mat is Spawntex, available from Pentair Aquatic Eco-Systems, Inc., Apopka, FL. A spawning mat may be retained in a spawning tray by a retainer flange that is coupled with a retainer post that extends through the spawning mat and is coupled with the spawning tray. The spawning mat may be about 25 mm in thickness or more, about 30 mm or more, about 40 mm or more, about 50 mm or more and any range between and including the thickness values provided. The bed wall of the spawning bed or spawning tray may be similar in height from the bed base and may have a height of about 30 mm or more, about 40 mm or more, about 50 mm or more and any range between and including the height values provided. The bed wall may be taller than the spawning material configured therein to prevent hooks from catching on the spawning material. The bed base of the spawning tray may have apertures therethrough to allow a flow of water and therefore oxygen to the eggs or fry. The apertures may be small enough to prevent a spawning material, such as gravel from falling through the apertures and may be about 5 mm or less in diameter or maximum dimension, about 4 mm or less, about 3 mm or less, about 2 mm or less, about 1 mm or less and any range between and including the values provided.

An alternating three-sided cover region geometry may be desirable to reduce or prevent the gamefish from seeing each other when in or when entering or exiting from adjacent cover regions. In a three-sided cover region design, a first cover region is formed by three fins and has an opening on a first side and a second adjacent cover region is also formed by three fins, one being in between the first and second cover region, and has an opening on the second side, opposite the first cover region. Put another way, the third fin of each of the first and second cover regions may alternate from the first side to the second side of the gamefish attractor. In this alternating three-sided cover region design, a gamefish may enter the cover region through an opening in the perimeter of the fins from an opposing side than an adjacent cover region.

A plurality of cover regions can be made by connecting frame extensions and fins in a desired row with one or more cover regions, two or more cover regions, three or more cover regions, five or more cover regions, ten or more cover regions and any number of cover regions between and including the number of regions provided. This arrangement makes it easier for a fisherman to know the orientation of the row of cover regions upon placement in a body of water. This understanding and knowledge of the orientation also enables the fisherman to more easily fish along the gamefish attractor.

The summary of the invention is provided as a general introduction to some of the embodiments of the invention, and is not intended to be limiting. Additional example embodiments including variations and alternative configurations of the invention are provided herein.

BRIEF DESCRIPTION OF SEVERAL VIEWS OF THE DRAWINGS

The accompanying drawings are included to provide a further understanding of the invention and are incorporated in and constitute a part of this specification, illustrate embodiments of the invention, and together with the description serve to explain the principles of the invention.

Figure 1:
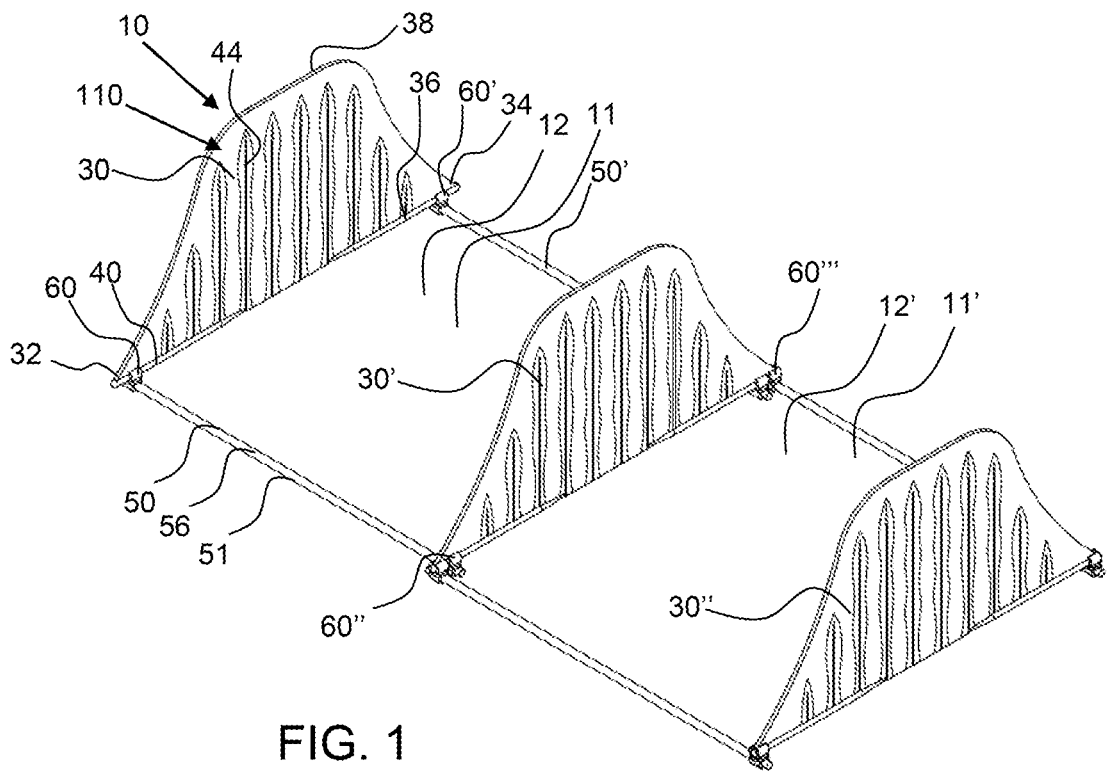
FIG. 1 shows a perspective view of a gamefish attractor comprising a plurality of cover regions configured in a row and formed by pairs of fins that extend up from cover frame.
Figure 2:
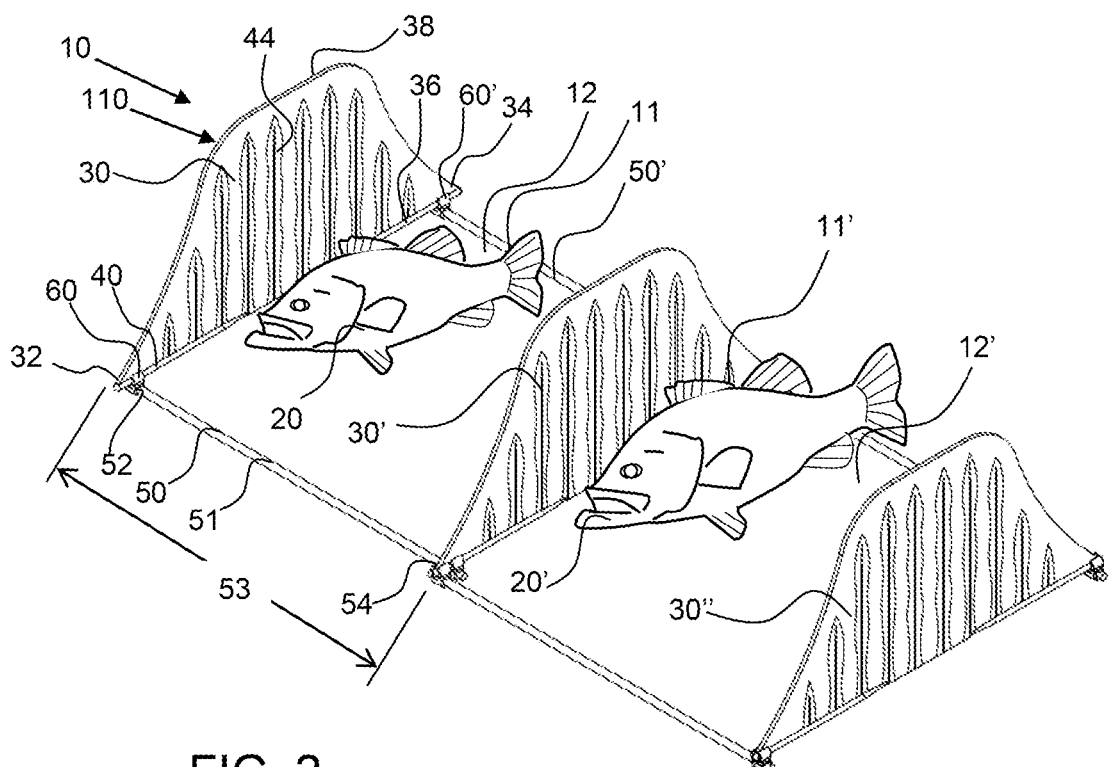
FIG. 2 shows a perspective view of the gamefish attractor shown in FIG. 1 with gamefish in the cover regions.

Corresponding reference characters indicate corresponding parts throughout the several views of the figures. The figures represent an illustration of some of the embodiments of the present invention and are not to be construed as limiting the scope of the invention in any manner. Some of the figures may not show all of the features and components of the invention for ease of illustration, but it is to be understood that where possible, features and components from one figure may be included in the other figures. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the present invention.

DETAILED DESCRIPTION OF THE ILLUSTRATED EMBODIMENTS

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Also, use of "a" or "an" are employed to describe elements and components described herein. This is done merely for convenience and to give a general sense of the scope of the invention. This description should be read to include one or at least one and the singular also includes the plural unless it is obvious that it is meant otherwise.

Certain exemplary embodiments of the present invention are described herein and are illustrated in the accompanying figures. The embodiments described are only for purposes of illustrating the present invention and should not be interpreted as limiting the scope of the invention. Other embodiments of the invention, and certain modifications, combinations and improvements of the described embodiments, will occur to those skilled in the art and all such alternate embodiments, combinations, modifications, improvements are within the scope of the present invention.

Referring now to FIGS. 1 to 7, an exemplary gamefish attractor system 10 produces a gamefish attractor 110 having a plurality of cover assemblies 11, 11' that form separate cover regions 12, 12' formed by pairs of fins 30, 30', and 30', 30" respectively, that extend up from a cover frame 56. The gamefish 20, 20' may spend time in the respective cover regions 12, 12' to more effectively snare baitfish as they swim by the fins. The cover frame 56 includes frame extensions 50, 50', such as rods 51, that extend from a first fin 30 to a second fin 30'. As shown, a plurality of cover regions 12, 12' may be configured in row of the gamefish attractor 10. The two cover regions 12, 12' share a fin 30', wherein the first cover region 12 is formed between fin 30 and fin 30' and the second cover region 12' is form between fin 30' and fin 30". The frame extensions 50 may have the same or different lengths 53 from a first end 52 to a second end 54. The frame extensions 50, 50' are coupled to the fins 30, 30' by interconnects 60, 60', 60", 60"' that may be detachably attachable to the fin and to the frame extension.

Figure 6:
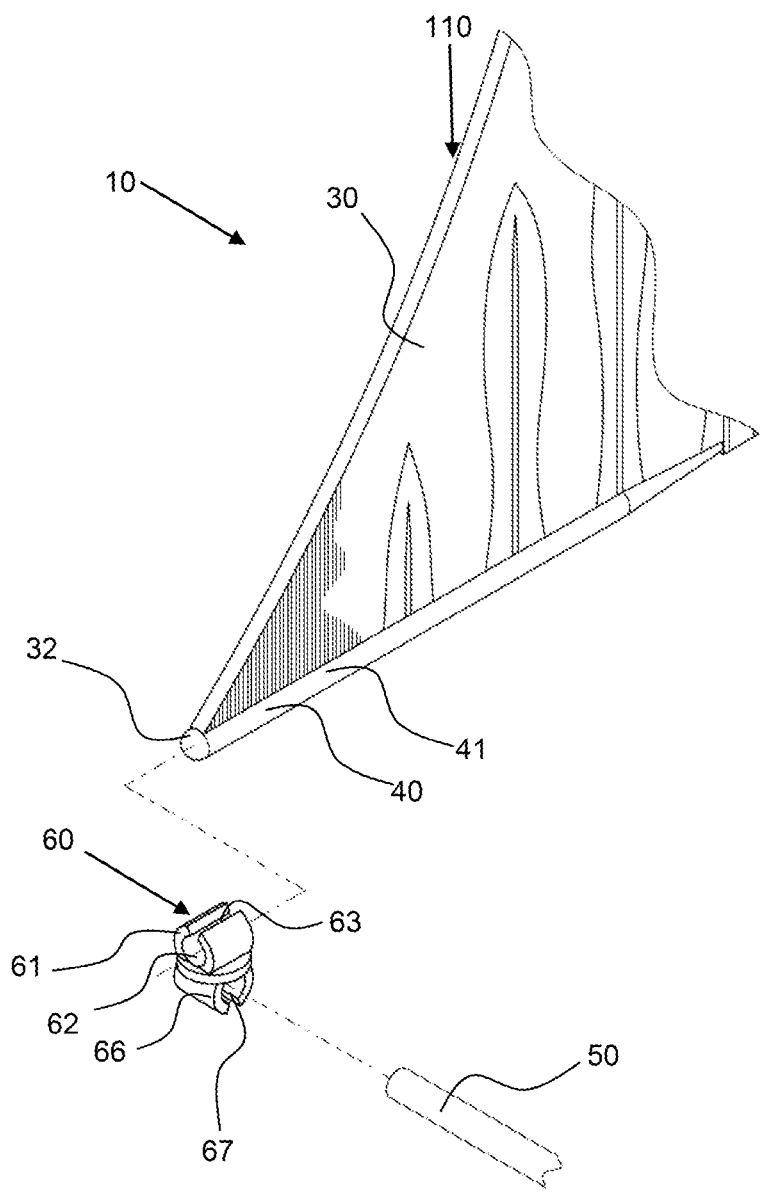
FIG. 6 shows a perspective view of a portion of the game fish attractor system shown in FIG. 1 with the fin configured to be retained to the frame extension by an interconnect having a first connect portion for connecting to the fin and a second connect portion for connecting the frame extension.
Figure 7:
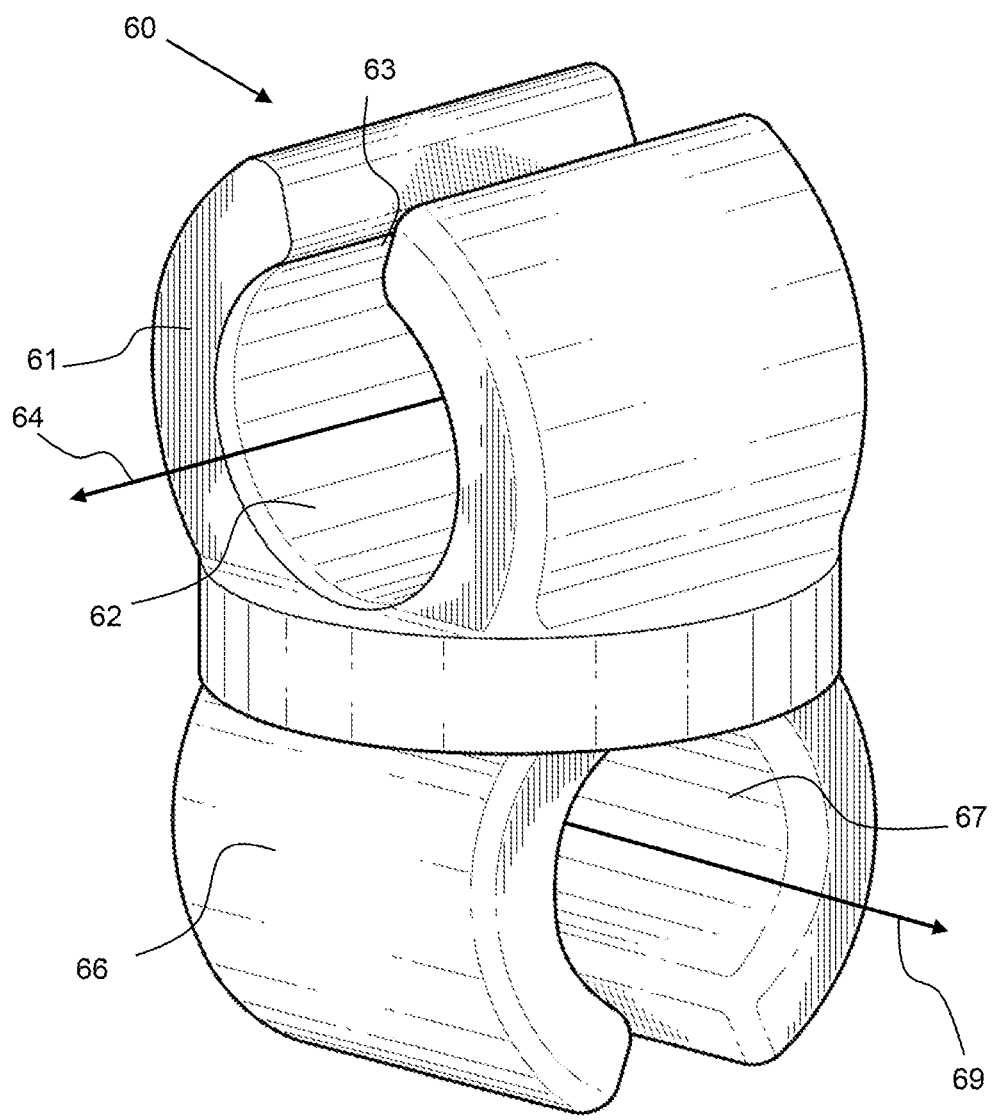
FIG. 7 shows a perspective view of an interconnect having a first connect portion for connecting to a fin and a second connect portion for connecting a frame extension or a second fin.

With reference to FIGS. 6 and 7, an interconnect 60 has a first connect portion 61 for connecting to the fin 30 and a second connect portion 66 for connecting to the frame extension 50. As shown in FIG. 6, the first end 32 of the fin 30 may be coupled to the first connect portion 61 by inserting the fin attachment 40, such as a cylindrical rod 41, into the first connection portion through the first slot 63. The first connect portion may be configured to expand the width of the first slot 63 to enable the fin attachment 40 to be pressed into the first connect aperture 62. The frame extension may be inserted into the second connect aperture of the second connect portion 66 through the second connect slot 66 and into the second connect aperture 67. As shown in FIG. 7, the interconnect 60 has the first interconnect portion 61 configured orthogonal to the second interconnect portion 66, wherein the first connect aperture axis 64 is orthogonal to the second connect aperture axis 69, or within about 15 degrees of orthogonal. The interconnect in reversible, wherein either the first or second interconnect portion can be coupled to the fin.

Each of the fins has a camouflage pattern 44, an imprint of vegetation, such as a plant, including a plurality of leaves, such as seagrass that is separated by an open space, the pattern is an alternating pattern with about a 50 mm repeating pattern distance 45 (shown in FIG. 3) to the pattern, wherein the leaf or seagrass is about 25 mm wide and darker in color and the open area between adjacent seagrass is about 25 mm. The repeating pattern may be about 100 mm or less, about 75 mm or less, about 50 mm or less, about 35 mm or less and any range between and including the values provided.

Figure 3:
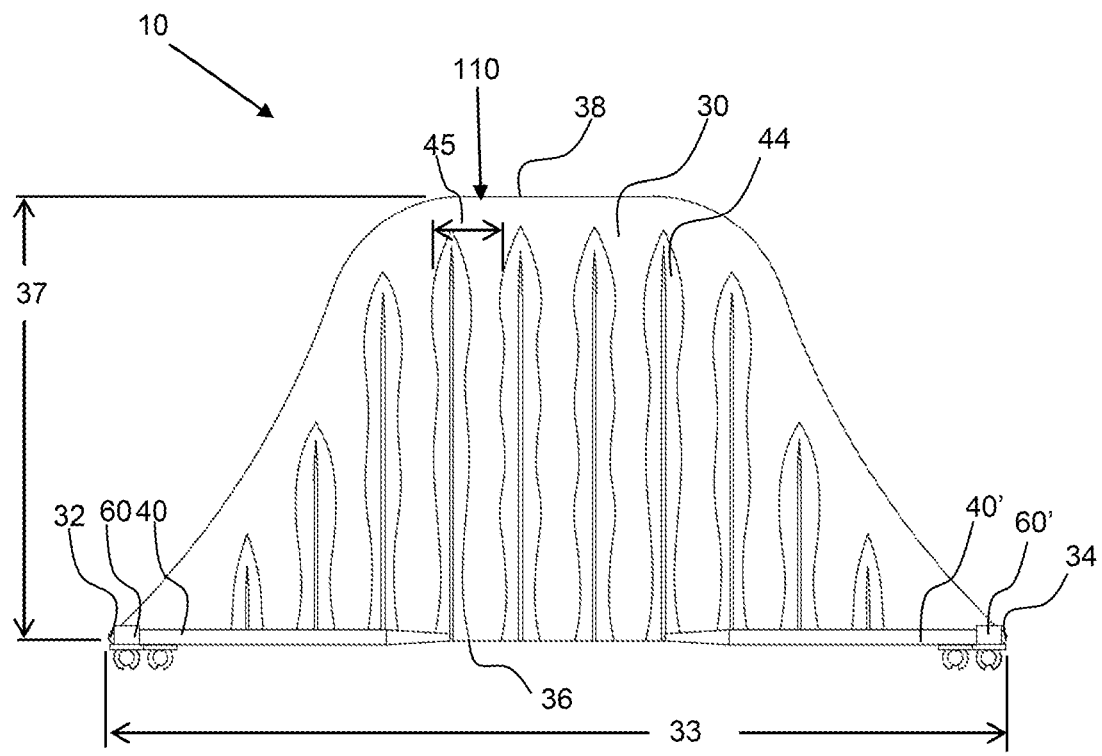
FIG. 3 shows an end view of the game fish attractor system shown in FIG. 1 with the fin retained to the frame extensions by interconnects.

As shown in FIG. 3, the fin 30 has a length 33 from a first end 32 to a second end 34. As shown, the fin attachments 40, 40' are cylindrical extensions or rods 41 that extend along the base end 36 of the fin 30. The fin 30 has a height 37 from the base end 36 to the extended end 38 and this height may be effective to provide cover for a gamefish. As shown, the extended end has a bell shape.

Figure 4:
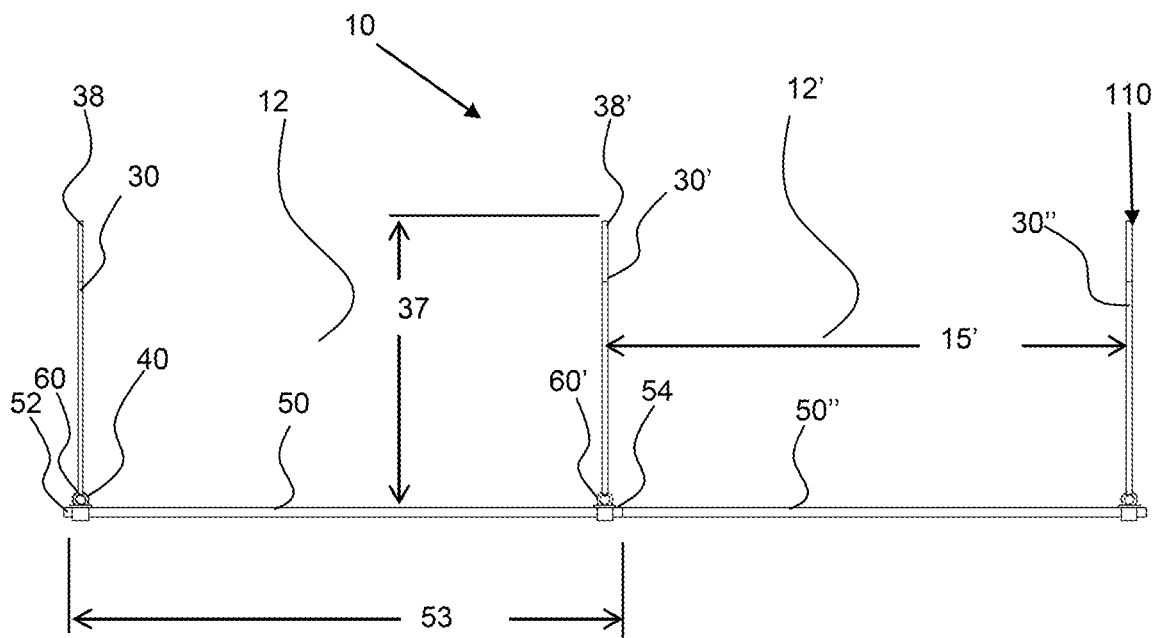
FIG. 4 shows a side view of the game fish attractor system shown in FIG. 1 with the fins retained to the frame extensions by interconnects.

As shown in FIG. 4, the frame extension 50 has a length 53 and this length may be the same or different between adjacent cover regions 12, 12' formed by the gamefish attractor system 10. The cover region 12' has a width 15' between the fins 30', 30".

Figure 5:
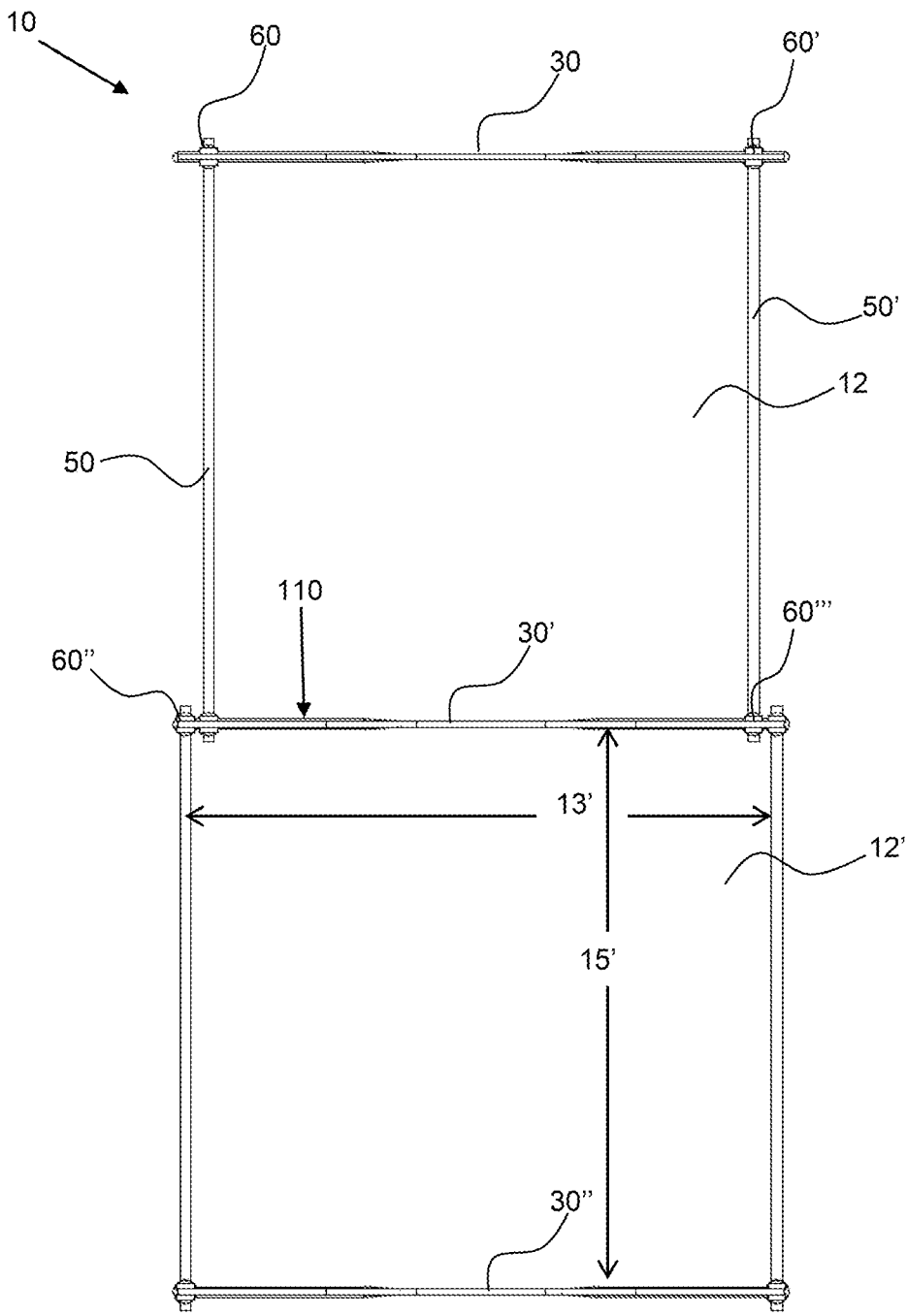
FIG. 5 shows a top view of the game fish attractor system shown in FIG. 1 with the fin retained to the frame extensions by interconnects.

As shown in FIG. 5, the interconnects 60", 60'" for the second cover region 12' are configured outside of the interconnects 60, 60' that form the first cover region 12. The cover region 12' has a length 13' and a width 15'. Again, any number of cover regions may be coupled together in series or in a row as shown.

Figure 8:
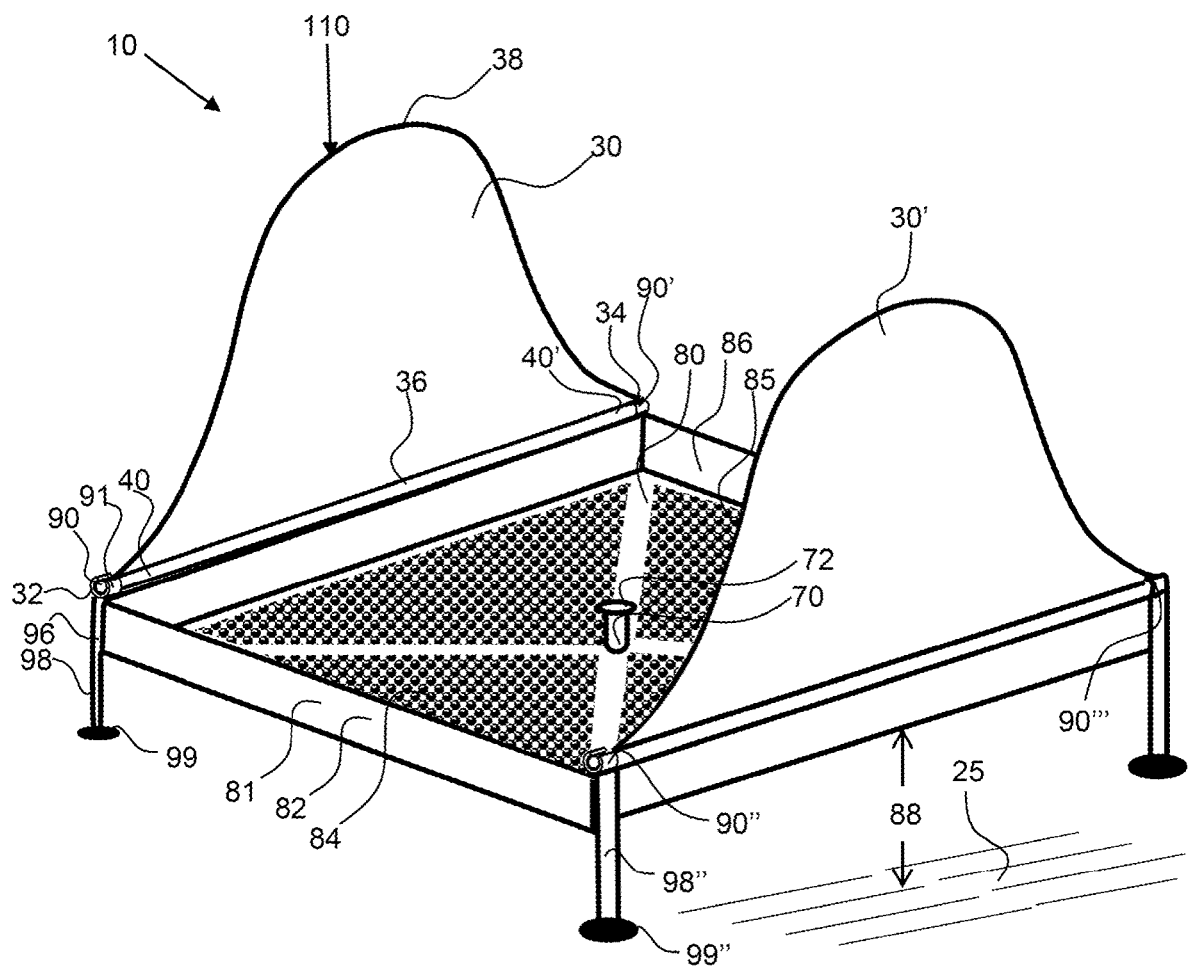
FIG. 8 shows a perspective view of a gamefish attractor system having fins attached to a spawning bed by bed interconnects that have a first connect portion for connecting to the fin and a second connect portion for connecting to the spawning bed.
Figure 8:
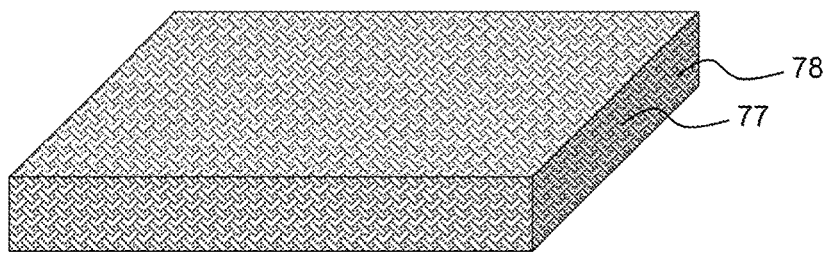
Figure 9:
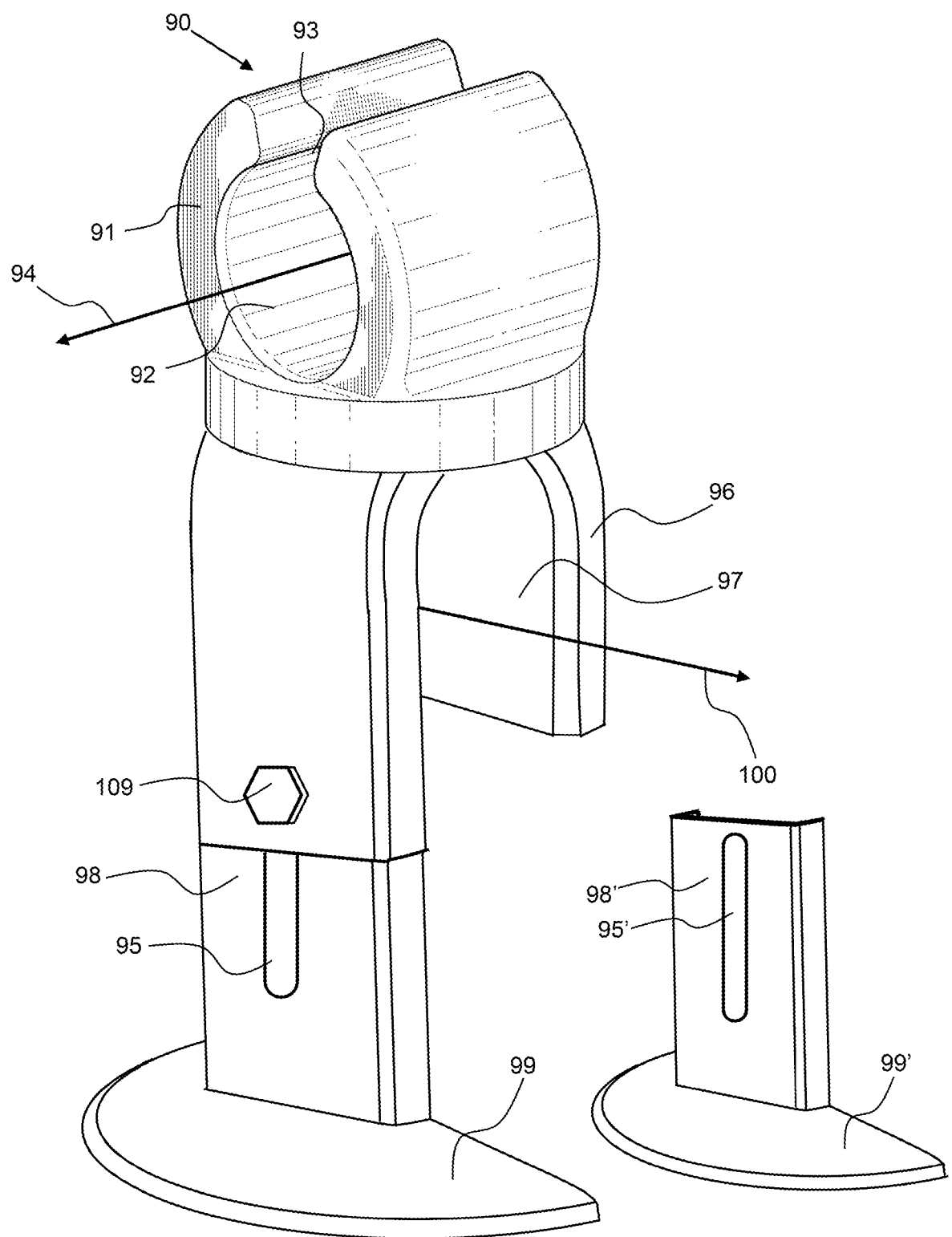
FIG. 9 shows a perspective view of a bed interconnect having a first connect portion for connecting to a fin or frame extension and a second connect portion for connecting to the spawning bed, and a foot coupled to a foot extension.

With reference now to FIGS. 8 and 9, a gamefish attractor system 10 has fins 30, 30' attached to a spawning bed 80 by bed interconnects 90, 90' and 90", 90'") respectively. Each of the bed interconnects have a first connect portion 91 for connecting to the fin or to a frame extension and a second connect portion 96 for connecting to the spawning bed. The spawning bed 80 has a bed frame 82 with bed walls 86 that extend up from the bed base 84, in use. A plurality of flow apertures 85 are configured in the bed base 84 to allow a flow of water and oxygen to the eggs or fry. The spawning bed is configured an offset distance 88 from the floor 25 of a body of water. This offset distance enables the flow of water and oxygen under the spawning bed and spawning material configured therein, through the flow apertures 85. Again, the apertures may be small to prevent gravel, eggs or fry from passing therethrough and may be about 5 mm or less, or 3 mm or less, or even 2 mm or less. A bed retainer 70 extends from the bed to retain a spawning mat 78 within the bed recess formed by the bed walls. The spawning mat 78 may be placed into the bed frame 82, or within the spawning tray 81, and retained by the retainer flange 72 extending over the top of the spawning mat 78. A retainer post may extend through the spawning mat and be secured to the bed frame or bed base. The spawning mat contains spawning material 77 that may be configured to receive and retain fish eggs therein and may be porous.

As shown in FIG. 9, a bed interconnect 90 has a first connect portion 91 for connecting to a fin or base extension, a second connect portion 96 for connecting to a spawning bed, and a bed foot 99 coupled to a leg extension 98. The second connect portion 96 has a second connect slot 97 for receiving a wall of the spawning bed, or bed frame. The first connect portion 91 has a first connect aperture 92 and a first connect slot 93. The bed interconnect 90 has the first interconnect portion 91 configured orthogonal to the second interconnect portion 96, wherein the first connect aperture axis 94 is orthogonal to the second connect aperture axis 100, or within about 15 degrees of orthogonal. The interconnect in reversible, wherein either the first or second interconnect portion can be coupled to the fin, wherein the second interconnect portion 96 also has a second connect slot 97. The length of the leg extension extending from the second connect portion 96 may be adjustable by securing the two components by insertion and attachment of the extension attachment 109 through the second connect portion 96 and through the extension slot 95 in the leg extension 98. A second leg extension 98' is shown for clarity having the bed foot 99' and the extension slot 95'.

Figure 10:
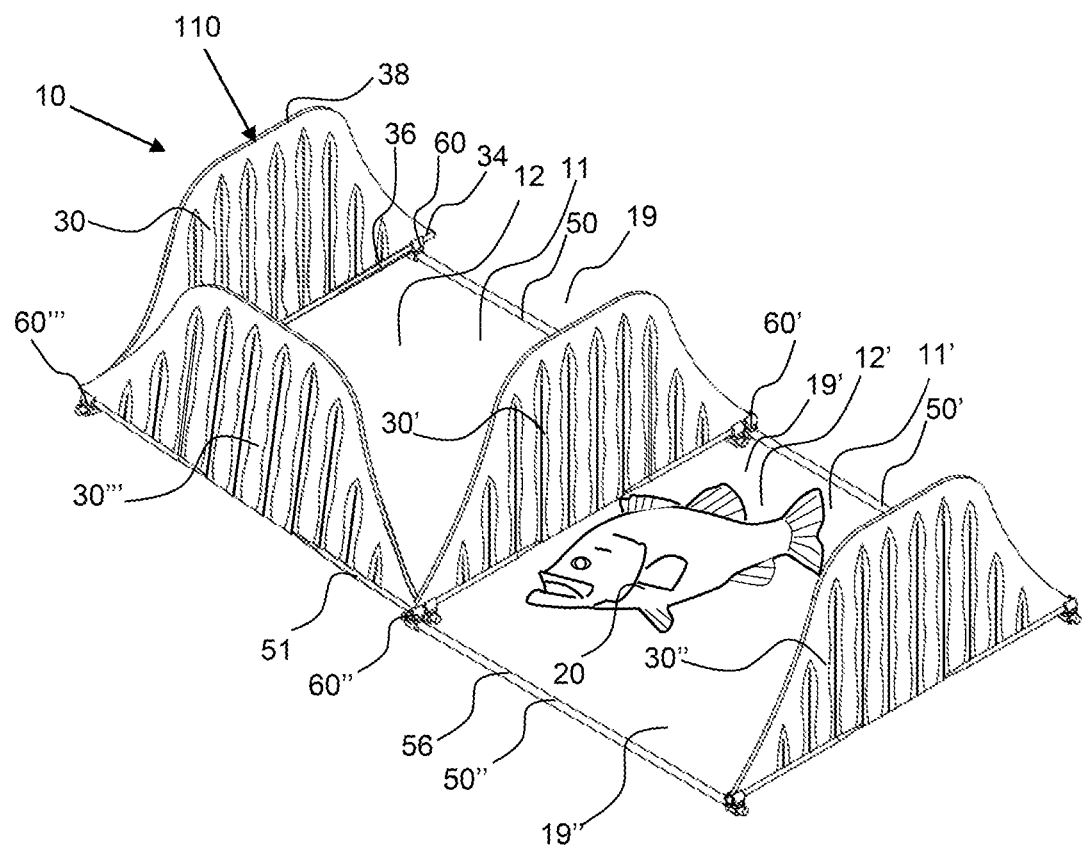
FIG. 10 shows a perspective view of a gamefish attractor system comprising a plurality of cover regions formed by pairs of fins that extend up from cover frame and one cover region formed by three fins that extend up from the cover frame.

As shown in FIG. 10, a gamefish attractor system 10 produces a plurality of cover assemblies 11, 11' having cover regions 12, 12' formed by fins 30, 30', 30", 30'". Cover region 11 is formed by three fins 30, 30' and 30' to form a three-sided cover region with a single opening 19 into the over region around the perimeter. Cover region 11' is formed by a pair of fins 30', 30" that extend up from a cover frame 56 and has openings 19' and 19" on opposing sides of the gamefish attractor 110. A gamefish 20 may spend time in the respective cover regions 12, 12' to more effectively snare baitfish as they swim by the fins. The cover frame 56 includes frame extensions 50, 50' and 50" such as rods 51, that extend from between fins. Frame extension 50 extends between fin 30 and 30', and cover region 12' has frame extensions 50' and 50" extending between fin 30' and fin 30". Note that cover region 12 has one frame extension and a third fin 30" extending between fins 30 and 30'. An additional fin may be placed between fin 30' and fin 30", or where frame extension 50' is shown to produce cover regions with access into the cover regions from opposing sides. This configuration may be preferred as it would more effectively separate the gamefish from each other during spawning as they guard their offspring. The two cover regions 12, 12' share a fin 30' to produce the cover regions. The frame extensions 50 may have the same or different lengths 53. The frame extension 50 is coupled to the fins 30, 30' by interconnects 60, 60', respectively, and the interconnect may be detachably attachable to the fin and to the frame extension. The fin 30' is coupled to the other fins 30, 30' forming the first cover region 12 by interconnects 60" and 60' and these interconnects may slip onto the base end 36 of the fins and may be detachable. The base end of the fins may be circular in cross section to enable the interconnect to be press fit over the base end.

It will be apparent to those skilled in the art that various modifications, combinations and variations can be made in the present invention without departing from the scope of the invention. Specific embodiments, features and elements described herein may be modified, and/or combined in any suitable manner. Thus, it is intended that the present invention cover the modifications, combinations and variations of this invention provided they come within the scope of the appended claims and their equivalents.

What is claimed is:
1. A gamefish attractor system comprising:
  a) a cover frame assembly comprising:
    i) a spawning bed tray comprising:
      a bed base; and
      bed walls including a first bed wall and a second bed wall extending up from the bed base;
    ii) a first fin;
    iii) a second fin;
    wherein each of the first fin and second fin comprise:
      a length from a first end to a second end;
      a height from a base end to an extended end;
      a fin attachment configured on the base end;
    iv) a plurality of bed interconnects, each comprising:
      a first connect portion comprising:
        a first connect aperture;
        a first connect slot extending into the first connect aperture;
        a first connect aperture axis;
      a second connect portion comprising:
        a second connect aperture;
        a second connect slot extending into the first connect aperture;
        a second connect aperture axis;
    v) a plurality of bed feet;
    wherein the first connect aperture axis is orthogonal to the second connect aperture axis;

wherein a first pair of interconnects of the plurality of interconnects couple the first fin to a first bed wall of the spawning bed tray with the second connect slot extending down over the first bed wall;

wherein a second pair of interconnects of the plurality of interconnects couple the second fin to a second wall of the spawning tray with the second connect slot extending down over the second bed wall to produce a first cover region;

wherein the first bed wall is opposite the second bed wall; and wherein the plurality of bed interconnects each further comprise a leg extension that extends down from the second connect portion to one of said plurality of bed feet.

2. The gamefish attractor system of claim 1, wherein the first fin and the second fin have a bell shape each with curved regions between the extended end and sloped regions that slope down to the base.

3. The gamefish attractor system of claim 1, wherein the first fin and the second fin have an imprint.

4. The gamefish attractor system of claim 3, wherein the imprint is of a plant.

5. The gamefish attractor system of claim 1, wherein the first frame extension and second frame extensions are rods.

6. The gamefish attractor system of claim 1, wherein the first connect aperture is circular.

7. The gamefish attractor system of claim 6, wherein the second connect aperture is circular.

8. The gamefish attractor system of claim 1, wherein the length of the first fin and the second fin is 50 cm or more.

9. The gamefish attractor system of claim 1, the height of the first fin and the second fin is 20 cm or more.

10. The gamefish attractor system of claim 1, wherein the cover frame assembly comprises:
   i) a third frame extension;
   ii) a fourth frame extension;
   iii) a third fin;
   wherein the third frame extension and the fourth frame extension extend from the second fin to said third fin to produce a second cover region.

11. The gamefish attractor system of claim 1, further comprising a third fin coupled to the first frame extension, wherein the first cover region has a single open side.

12. The gamefish attractor system of claim 1, further comprising wherein the spawning bed tray is configured to receive a spawning material.

13. The gamefish attractor system of claim 1, wherein the first fin and second fin have a camouflage pattern.

14. The gamefish attractor system of claim 13, wherein the camouflage pattern is seagrass extending vertically up along the fin from the base end toward the extended end.

15. The gamefish attractor system of claim 14, wherein the camouflage pattern is a repeating pattern; wherein a distance of the repeating pattern is 100 mm or less.

16. The gamefish attractor system of claim 1, wherein the first fin and second fin are plastic.

17. The gamefish attractor system of claim 1, wherein the first fin and second fin float vertically from the base end to the extended end, wherein the extended end is vertically above the base end when the base end is configured on a floor of a body of water.

18. The gamefish attractor system of claim 1, wherein the first fin and second fin are configured at least 50 cm apart from each other across the spawning bed tray.

* * * * *